(12) United States Patent
Antonevich et al.

(10) Patent No.: US 10,808,607 B2
(45) Date of Patent: Oct. 20, 2020

(54) COMBUSTION CHAMBER ELASTICITY DEVICE

(71) Applicant: Cummins Inc., Columbus, IN (US)

(72) Inventors: John M. Antonevich, Bemus Point, NY (US); Reid Irish, Stockton, NY (US); Stephen D. Cofer, Jr., Sugar Grove, PA (US); Kent H. Clark, Panama, NY (US); Garrett Blum, Sugar Grove, PA (US); Michael Kosinski, Ashville, NY (US); Beth Wagner, Jamestown, NY (US); Mark Gray, Falconer, NY (US)

(73) Assignee: Cummins Inc., Columbus, IN (US)

( * ) Notice: Subject to any disclaimer, the term of this patent is extended or adjusted under 35 U.S.C. 154(b) by 171 days.

(21) Appl. No.: 15/840,300

(22) Filed: Dec. 13, 2017

(65) Prior Publication Data

US 2018/0100432 A1    Apr. 12, 2018

Related U.S. Application Data

(63) Continuation of application No. PCT/US2016/037511, filed on Jun. 15, 2016.

(Continued)

(51) Int. Cl.
*F02B 75/04* (2006.01)
*F16J 1/22* (2006.01)
(Continued)

(52) U.S. Cl.
CPC .............. *F02B 75/045* (2013.01); *F16C 7/04* (2013.01); *F16C 7/06* (2013.01); *F16J 1/22* (2013.01);
(Continued)

(58) Field of Classification Search
CPC ..... F16J 7/00; F16J 1/22; F02B 75/045; F16C 7/06; F16C 7/04; F16C 2360/22; F16C 2202/08
See application file for complete search history.

(56) References Cited

U.S. PATENT DOCUMENTS

| 3,390,925 A | 7/1968 | Fangman |
| 4,015,913 A | 4/1977 | Nakamura |

(Continued)

FOREIGN PATENT DOCUMENTS

| CN | 104704199 | 6/2015 |
| DE | 10353396 | 7/2004 |

(Continued)

OTHER PUBLICATIONS

Search Report and Written Opinioin, PCT Appln. No. PCT/US16/037511, dated Sep. 9, 2016, 10 pgs.

(Continued)

*Primary Examiner* — Sizo B Vilakazi
(74) *Attorney, Agent, or Firm* — Taft Stettinius & Hollister LLP (57) ABSTRACT

An energy storage device is provided for a combustion chamber of an internal combustion engine. The energy storage device includes first and second end connectors connected to respective ones of a piston and crankshaft, and a flexible connection rod portion rotatably connected with the first and second end connectors. The flexible connection rod portion elastically buckles above a predetermined cylinder pressure threshold to store combustion energy and provide a more constant pressure combustion process.

18 Claims, 4 Drawing Sheets

Related U.S. Application Data (60) Provisional application No. 62/175,715, filed on Jun. 15, 2015.

(51) Int. Cl.
*F16J 7/00* (2006.01)
*F16C 7/04* (2006.01)
*F16C 7/06* (2006.01)

(52) U.S. Cl.
CPC .............. *F16J 7/00* (2013.01); *F16C 2202/08* (2013.01); *F16C 2360/22* (2013.01)

(56) References Cited

U.S. PATENT DOCUMENTS

| | | | | |
|---|---|---|---|---|
| 4,111,164 | A * | 9/1978 | Wuerfel | F02B 75/045 |
| | | | | 123/197.3 |
| 5,335,632 | A * | 8/1994 | Hefley | F02B 75/045 |
| | | | | 123/48 B |
| 5,617,820 | A | 4/1997 | Beardmore et al. | |
| 5,673,666 | A | 10/1997 | Beardmore et al. | |
| 5,758,811 | A | 6/1998 | Collins | |
| 6,223,703 | B1 * | 5/2001 | Galvin | F01B 9/06 |
| | | | | 123/197.4 |
| 6,237,559 | B1 | 5/2001 | Russ et al. | |
| 6,467,373 | B1 * | 10/2002 | El Tahry | F02B 1/12 |
| | | | | 123/48 B |
| 6,566,357 | B1 | 5/2003 | Rao et al. | |
| 7,311,079 | B2 | 12/2007 | Surnilla et al. | |
| 7,318,397 | B2 * | 1/2008 | Ward | F02B 75/04 |
| | | | | 123/197.1 |
| 7,905,221 | B2 | 3/2011 | Salminen | |
| 9,243,710 | B2 | 1/2016 | Henriques, Jr. et al. | |
| 2005/0284429 | A1 * | 12/2005 | Ward | F02B 75/041 |
| | | | | 123/48 B |
| 2010/0175645 | A1 | 7/2010 | Bergor | |
| 2012/0031227 | A1 * | 2/2012 | De Souza | F16C 7/023 |
| | | | | 74/579 E |
| 2012/0097125 | A1 | 4/2012 | Doss | |
| 2012/0312273 | A1 | 12/2012 | Weverka | |
| 2013/0118846 | A1 * | 5/2013 | Zimmer | F16F 9/0218 |
| | | | | 188/281 |
| 2014/0041620 | A1 * | 2/2014 | Henriques, Jr. | F16J 1/10 |
| | | | | 123/197.3 |
| 2014/0137819 | A1 | 5/2014 | McConville et al. | |

FOREIGN PATENT DOCUMENTS

| | | |
|---|---|---|
| DE | 202005022048 | 2/2013 |
| EP | 317000 | 3/1930 |
| EP | 1462667 | 5/2008 |
| FR | 812116 | 4/1937 |
| GB | 317000 | 3/1930 |
| GB | 2494718 | 3/2013 |
| WO | 2005049990 | 6/2005 |
| WO | 2010080963 | 7/2010 |
| WO | 2013150371 | 10/2013 |

OTHER PUBLICATIONS

European Search Report, EP Patent No. 16812281 dated Dec. 4, 2018, Cummins Inc. 11 pgs.

Chinese Office Action; The State Intellectual Property Office of the People's Republic of China; Chinese Patent Application No. 201680034880, 20 pgs.; dated Apr. 2, 2019.

Chinese Office Action; The State Intellectual Property Office of the People's Republic of China; Chinese Patent Application No. 201711017084; dated Dec. 3, 2019, 7 pgs.

English translation of Chinese Office Action; The State Intellectual Property Office of the Peeple's Republic of China; Chinese Patent Application No. 201711017084; dated Dec. 3, 2019, 12 pgs.

Chinese Office Action; The State Intellectual Property Office of the People's Republic of China; Chinese Patent Application No. 201711017084; dated May 26, 2020; 8 pages.

European Patent Office, EP Communication Pursuant to Article 94(3) EPC issued in Patent Application No. 16 812 281.0 dated May 11, 2020, 4 pp.

* cited by examiner

COMBUSTION CHAMBER ELASTICITY DEVICE

BACKGROUND

Internal combustion engines operate with combustion energy created by combustion of fuel in a charge flow to one or more cylinders of the engine. This combustion energy is transferred into usable work. The ability to provide greater control over this combustion energy can provide engine performance enhancements. Therefore, further improvements in this area are needed.

SUMMARY

According to one aspect, there is disclosed herein an energy storage device for a combustion chamber that includes a connection rod for connecting the piston and the crankshaft. In one embodiment, the connection rod includes a flexible connection rod portion that provides a more constant combustion pressure since the device stores and releases energy during the combustion process. For example, the energy storage device can store energy in the flexible connection rod portion during peak cylinder pressures by converting the peak cylinder pressure to strain energy that is stored and then released to provide a more constant combustion pressure during the combustion process.

According to a further aspect, a combustion chamber energy storage device includes an elongated flexible connection rod portion that forms a spring element acted on by a piston via the combustion pressure created by the combustion process. In a specific embodiment, the connection rod portion is configured to provide a high initial stiffness that replicates existing stiff connection rods to maintain high compression ratios, but is configured to undergo elastic buckling at peak cylinder pressures above a cylinder pressure threshold to store energy and provide a more constant combustion process than provided by conventional connection rods.

According to another aspect, an energy storage connection rod is provided that includes multiple parts assembled to form the connection rod, including a first end connector that is connected to or connectable with a piston or piston connecting component, a second end connector that is connected or connectable with a crankshaft or crankshaft connecting component, and a flexible rod portion extending between and rotatably connecting the first and second end connectors. The flexible rod portion can be made from the same or different material than the end connectors, and can be made from a single piece or multiple pieces of material. The flexible rod portion elastically buckles to store energy without involving compression springs or telescoping or sliding parts for the rod portion between the first and second end connectors.

In one embodiment, the end members of the flexible rod portion are keyed into the respective first and second end connectors for rotatable connection therewith. In another embodiment, the end members of the flexible rod portion each include a flat terminal end that spaces the axial end of the flexible rod portion from the associated end connector to better distribute load to the respective end connector. In further embodiments, fasteners can secure the end members to the end connectors, and/or the end connectors include reliefs or chamfered surfaces where the flexible rod portion enters the end connectors to allow the flexible rod portion to flex without stress concentrations at the junction with the end connector.

Other embodiments contemplate other end connectors for connecting the ends of the flexible rod portion with the piston or piston connecting component and the crankshaft or crankshaft connecting component. Still other embodiments contemplate a flexible rod portion that includes multiple pieces extending between the end connectors. For example, one or more of the flexible rod portions can be configured to transmit primarily tension loading and another one or more of the flexible rod portions can be configured to transmit primarily compression loading and that is pre-loaded or pre-buckled at a certain load threshold.

Further aspects, embodiments, forms, features, benefits, objects, and advantages shall become apparent from the detailed description and figures provided herewith.

DETAILED DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
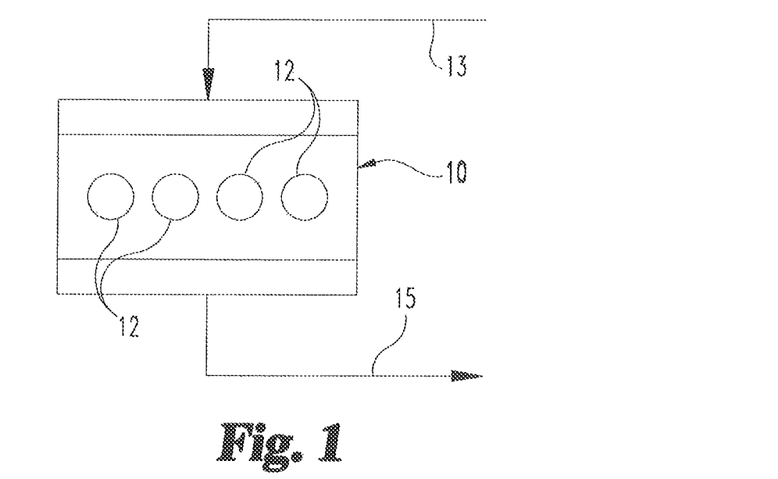
FIG. 1 is a schematic illustration of an internal combustion engine system.
Figure 2:
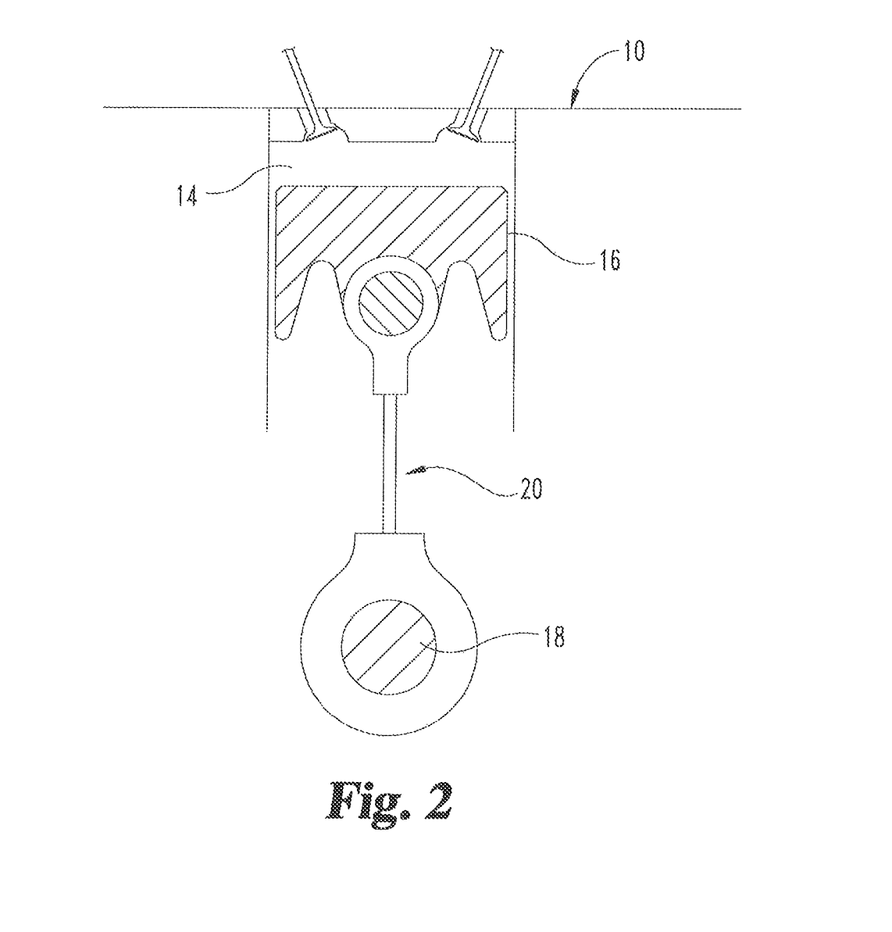
FIG. 2 is a schematic illustration of a combustion chamber of the engine with a piston connected to a crankshaft with an energy storage device.

Referring to FIG. 1, there is shown an internal combustion engine 10 including a plurality of cylinders 12 that receive a charge flow from an intake system 13 and combust fuel to produce an exhaust flow to exhaust system 15. Engine 10 can be of any type and include any number of cylinders. In one embodiment, engine 10 is a diesel engine. Referring further to FIG. 2, each cylinder 12 includes a combustion chamber 14 housing a piston 16 connected to a crankshaft 18 with an energy storage device 20.

Figure 3:
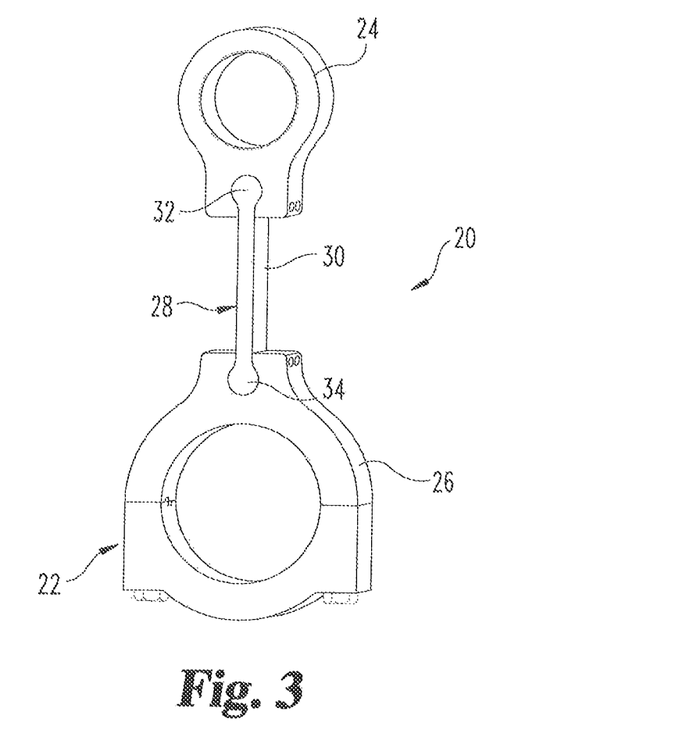
FIG. 3 is a perspective view of one embodiment of an energy storage device.

Referring further to FIG. 3, in one embodiment energy storage device 20 incudes a connection rod 22 having a first end connector 24, a second end connector 26, and a flexible connection rod portion 28 extending between and connecting first end connector 24 with second end connector 26. First end connector 24 is connected directly or indirectly to piston 16 as shown in FIG. 2. Second end connector 26 is connected directly or indirectly to crankshaft 18 as shown in FIG. 2.

Figure 4:
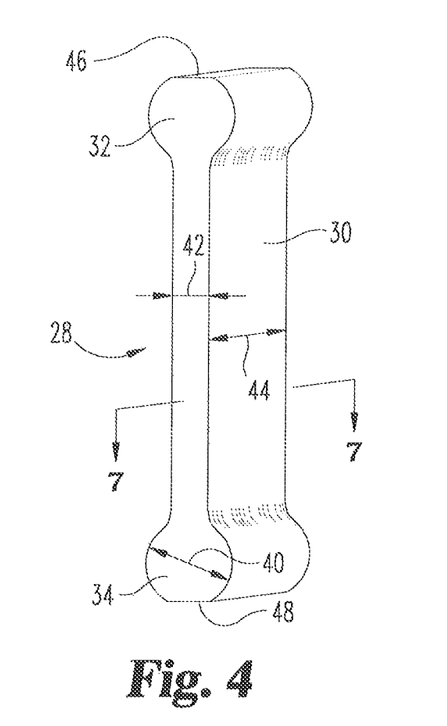
FIG. 4 is a perspective view of a flexible connection rod portion of the energy storage device.

As further shown in FIG. 4, flexible connection rod portion 28 includes an elongated body 30 that extends between a first end 32 at or oriented toward the piston 16 and a second end 34 at or oriented toward the crankshaft 18. First and second ends 32, 34 are rotatably connected to first and second end connectors 24, 26 so that body 30 remains straight or un-flexed under most operating conditions regardless of crankshaft angle, preventing lateral flexing in either direction during rotation of the crankshaft 18. However, under specific cylinder pressure conditions, body 30 is configured to flex. In a specific embodiment, body 30 is configured to flex in one direction during every other rotation of the crankshaft 18. Other embodiments contemplate flexing in multiple directions.

The flexing of body 30 is caused by column buckling followed by elastic bending which occurs at cylinder pressures at or above an elevated cylinder pressure threshold independently of the crankshaft rotation and crank angle of the connection rod 22. Therefore, body 30 forms an elastic column that relies on compression loading induced buckling to control the displacement characteristics without relative sliding or movement of components of the energy storage device 20. As a result, the energy storage device 20 provides a near constant compression ratio of the charge but expands after heat release.

Figure 4A:
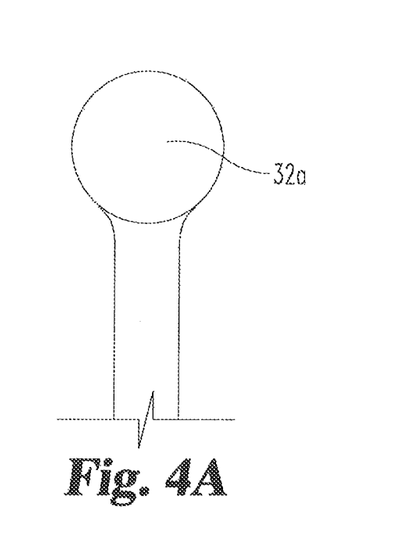
FIG. 4A is a perspective view of another embodiment shaped end portion of the flexible connection rod portion of the energy storage device.

In the illustrated embodiment, first and second ends 32, 34 of connection rod portion 28 each form a cylindrical shape with a diameter 40 that is greater than a width 42 of body 30. In addition, body 30 includes a depth 44 orthogonal to and greater than width 42. Depth 44 extends in a direction paralleling a longitudinal axis of crankshaft 18. In one specific embodiment, depth 44 is at least twice the width 42 so that elastic buckling occurs laterally along depth 44. The cylindrically shaped ends 32, 34 each extend along and have a depth that corresponds to the depth 44. Ends 32, 34 further each have a truncated part at an outermost terminal end 46, 48 thereof that is flat or otherwise profiled for desired load distribution. Other embodiments contemplate one or both of ends 32, 34 is spherically shaped, such as shown in FIG. 4A.

Figure 5:
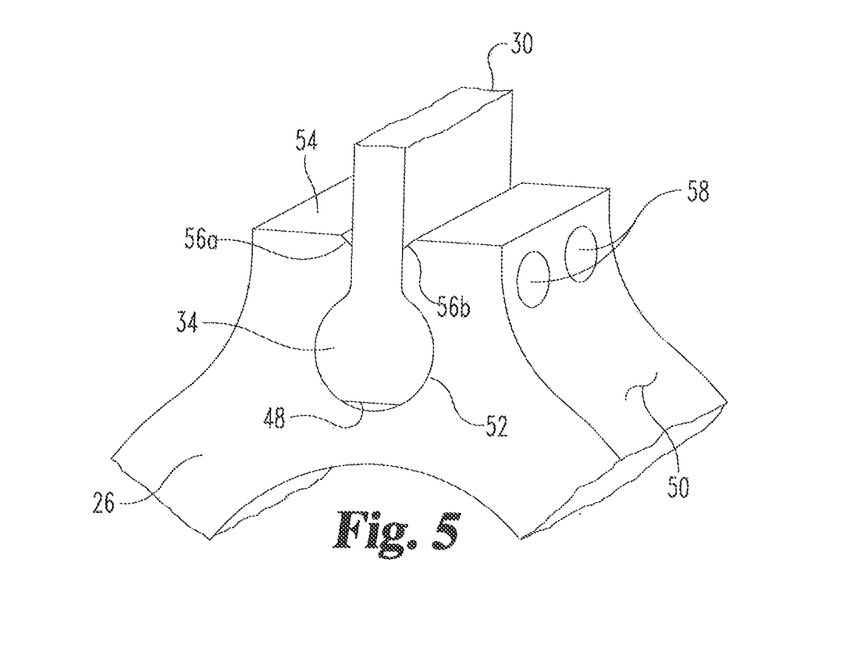
FIG. 5 is an enlarged perspective view of the connection of the flexible connection rod with an end connector of the energy storage device.

Second end connector 26 includes a ring shaped body portion 50 that defines a receptacle 52 sized and shaped for receiving the cylindrically shaped end 34 of connection rod portion 28, providing a rotatable connection therewith. Receptacle 52 opens at an end surface 54 of second end connector 26 facing first end connector 24. End surface 54 defines chamfered or beveled entrance surfaces 56a, 56b at receptacle 52 to allow flexing of connection rod portion 28 without second end connector 26 inducing stress concentrations into body 30 during flexing. The flat truncated end 48 is spaced from second end connector 26 in receptacle 52 to provide better load distribution into the body of second end connector 26, eliminating point loading on second end connector 26 at the second end 34.

Fasteners 58 can be provided to connect second end 34 to second end connector 26. In one specific embodiment, fasteners 58 are heated pins with opposing tapers. Other embodiments contemplate other types of fasteners. It should be understood that first end connector 24 is similarly sized and configured to provide a rotatable connection with first end 32 of connection rod portion 28.

Other embodiments contemplate other connections between one or both of first and second ends 32, 34 and end connectors 24, 26. Clamping fasteners, dovetails, interference fits, wedges, and other types of connections are possible, by way of illustration and not limitation.

According to one embodiment, energy storage device 20 includes a multi-state mechanical linkage with multiple components 24, 26 and 28 that increase control over the transfer of combustion energy into usable work in an internal combustion engine. Energy storage device 20 converts the highest portion of the cylinder pressure curve into strain energy to produce a more constant pressure combustion process as the energy storage device 20 stores and then releases energy. For example, peak cylinder pressure is stored as strain energy for constant pressure combustion by using the flexible connection rod portion 28 as the elastic element acted on by the cylinder pressure against the full piston area. Euler column buckling of body 30 coupled with rotatable end connections achieve a very high initial stiffness similar to conventional connection rods to maintain high compression ratios, followed by a dramatic reduction in stiffness as the body 30 undergoes elastic buckling to store the pressure at a much lower spring rate.

Energy storage device 20 may be used to provide significant performance enhancements in internal combustion engine 10 by changing a single component, i.e. switching a conventional connection rod for an energy storage device 20 having a flexible connection rod portion 28 rotatably connected to first and second end connectors 24, 26, without investment in a new engine or other new engine components.

In a further embodiment, first and second end connectors 24, 26 are used to attach a flexible, elastic center section of a multiple piece connection rod 22 by means of a cylindrically shaped keyway or receptacle 52 at both ends of the connection rod portion 28. The use of multiple pieces 24, 26, 28 allows a connection rod 22 that is made up of different materials and of different material properties. For example, the connection rod portion 28 can be made with a material and/or cross-sectional dimension to provide the desired stiffness up to a compression load threshold, and then buckle to provide elasticity at peak cylinder pressures. In one embodiment, connection rod portion 28 is comprised of a single linear elastic piece forming body 30.

Figure 6:
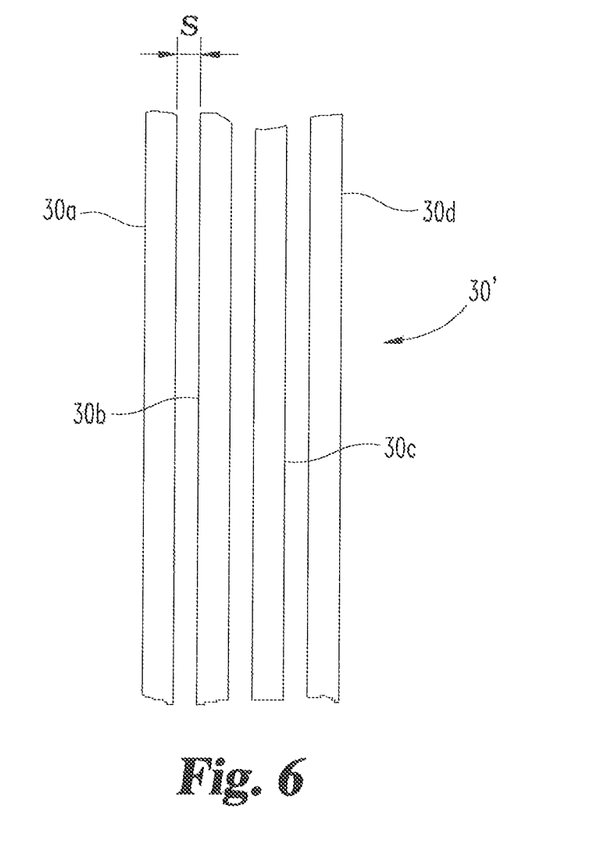
FIG. 6 is a schematic elevation view of another embodiment of the body of the flexible connection rod.
Figure 7:
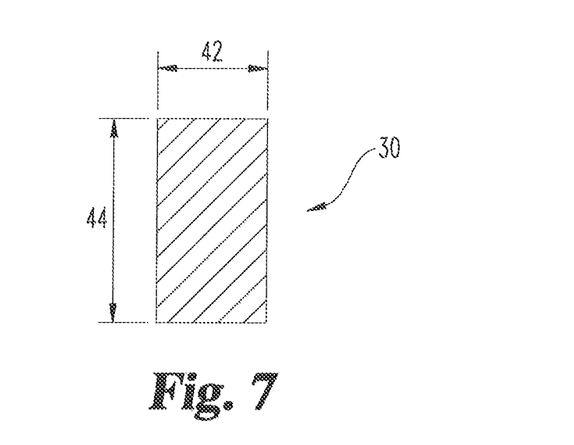
FIG. 7 is a cross-section along line 7-7 of FIG. 4.

In another embodiment, such as shown in FIG. 6, connection rod portion 28 is comprised of multiple pieces 30a, 30b, 30c, 30d of side-by-side linear elastic pieces metal elements forming body 30'. While four pieces 30a-30d are shown, more or fewer pieces can be provided. In certain embodiments, side-by-side linear elastic pieces 30a-30d are spaced laterally at a spacing s from one another to form body 30'. In yet another embodiment, the one or more pieces 30-30d are offset from a center line connecting the rotational centers of end connectors 24, 26. In another embodiment, the connection rod portion 28 includes a constant or variable cross-section with or without cavities or openings. In a specific embodiment, the cross-section is both rectangular and solid along the entire length of the connection rod, as shown in FIG. 7.

Energy storage device 20 described herein, as compared to convention connection rods, provides increased torque and power across an engine speed range, higher engine speeds, greater engine braking, improved fuel economy, better cold start and white smoke control and a larger design space for emissions control.

Various aspects of the present disclosure are contemplated. For example, in one aspect a device for connecting a piston and a crankshaft of an internal combustion engine is provided. The device includes a first end connector for connection with the piston and a second end connector for connection with the crankshaft. The device also includes a connection rod portion including an elongated flexible body extending between a first end rotatably connected to the first end connector and a second end rotatably connected to the second end connector.

In one embodiment of the device, the connection rod portion includes a first shaped portion at the first end of the connection rod portion and a second shaped portion at the second end of the connection rod portion. Each of the first and second end connectors includes a correspondingly shaped receptacle for receiving respective ones of the first and second shaped portions.

In one refinement of the above embodiment, the first and second shaped portions include one of a spherical shape and a cylindrical shape. In another refinement, each of the first and second portions includes a flat or profiled surface at a terminal end of the connection rod portion. In yet another refinement, each of the first and second end connectors includes an end surface facing the other of the first and second end connectors, and each of the shaped receptacles includes chamfered surfaces defining an opening into the shaped receptacle at the end surface of the respective one of the first and second end connectors. In another refinement, the device includes fasteners connecting each of the first and second shaped portions to respective ones of the first and second end connectors.

In another embodiment of the device, the elongated flexible body defines a cross section with a depth extending in a direction paralleling an axis of rotation of the crankshaft and a width that is orthogonal to the depth, and the depth is at least twice the width.

In another embodiment of the device, the piston is housed in a combustion chamber of the internal combustion engine and the elongated flexible body is configured to remain stiff at cylinder pressures in the combustion chamber that are under a cylinder pressure threshold and to elastically buckle at cylinder pressures above the cylinder pressure threshold. In a refinement of this embodiment, cylinder pressure above the cylinder pressure threshold is converted to strain energy by the connection rod portion to store energy from the cylinder pressure and provide a constant pressure combustion process above the cylinder pressure threshold.

In another embodiment of the device, the elongated flexible body includes a plurality of adjacent flexible rod portions, and one or more of the plurality of flexible rod portions is configured to transmit more tension loading than compression loading between the piston and crankshaft and one or more other of the flexible rod portions is configured to transmit more compression loading than tension loading between the piston and crankshaft.

Another aspect, for example, includes a method for storing energy in a combustion chamber of an internal combustion engine. The method includes combusting fuel in the combustion chamber, where the combustion chamber includes a piston connected to a crankshaft with a connection rod portion; converting cylinder pressures in the combustion chamber that are above a cylinder pressure threshold to strain energy with the connection rod portion; storing the strain energy in the connection rod portion; and releasing the stored strain energy in response to cylinder pressures in the combustion chamber being less than the cylinder pressure threshold.

In one embodiment of the method, the connection rod portion is configured to elastically buckle to convert the cylinder pressures above the cylinder pressure threshold to strain energy. In another embodiment of the method, the connection rod portion remains stiff between the piston and crankshaft at cylinder pressures below the cylinder pressure threshold and elastically buckles at cylinder pressures above the cylinder pressure threshold.

In yet another embodiment of the method, a first end connector is associated with the piston and a second end connector opposite the first end connector is associated with the crankshaft. In a refinement of this embodiment, the method includes rotatably connecting the connection rod portion to the first and second end connectors. In a further refinement, the connection rod portion includes a first shaped portion at a first end of the connection rod portion that is rotatably received in a correspondingly shaped receptacle of the first end connector, and a second shaped portion at a second end of the connection rod portion that is rotatably received in a correspondingly shaped receptacle of the second end connector.

In a further refinement, the first and second shaped portions and the first and second shaped receptacles include one of a cylindrical shape and a spherical shape. In another refinement, each of the first and second shaped portions of the connection rod portion includes a flat surface at a respective terminal end of the connection rod. In yet another refinement, each of the first and second end connectors includes an end surface facing the other of the first and second end connectors, and each of the shaped receptacles includes chamfered surfaces defining an opening into the adjacent shaped receptacle at the respective end surface to receive the respective first and second shaped portions at the first and second ends of the connection rod portion. In another refinement, the method includes connecting each of the first and second shaped portions of the connection rod portion to respective ones of the first and second end connectors with fasteners.

In another embodiment, the connection rod portions includes an elongated flexible body that defines a cross section with a depth extending in a direction paralleling an axis of rotation of the crankshaft and a width that is orthogonal to the depth, and the depth is at least twice the width.

While the invention has been illustrated and described in detail in the drawings and foregoing description, the same is to be considered as illustrative and not restrictive in character, it being understood that only the certain embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms"engaged," "connected," "supported," and "coupled" and variations thereof are used broadly and encompass both direct and indirect engagements, connections, supports, and couplings.

The invention claimed is:

1. A device for connecting a piston and a crankshaft of an internal combustion engine, comprising:
   a first end connector for connection with the piston;
   a second end connector for connection with the crankshaft;
   a connection rod portion including an elongated flexible body extending between a first end rotatably connected to the first end connector and a second end rotatable connected to the second end connector so that the elongated flexible body remains straight regardless of the angle of the crankshaft unless the elongated flexible body is flexed by cylinder pressure conditions, wherein:

the connection rod portion includes a first shaped portion at the first end of the connection rod portion and a second shaped portion at the second end of the connection rod portion;

each of the first and second end connectors includes a correspondingly shaped receptacle for receiving respective ones of the first and second shaped portions; and the first and second shaped portions each include a cylindrical shape with a diameter that is greater than a width of the elongated flexible body, wherein the elongated flexible body includes a depth orthogonal to and greater than the width, wherein the depth extends in a direction parallel to a longitudinal axis of the crankshaft, and the cylindrical shape of each of the first and second shape portions corresponds in depth to the depth of the elongate flexible body.

2. A device for connecting a piston and a crankshaft of an internal combustion engine, comprising:

a first end connector for connection with the piston;

a second end connector for connection with the crankshaft;

a connection rod portion including an elongated flexible body extending between a first end rotatably connected to the first end connector and a second end rotatably connected to the second end connector so that the elongated flexible body remains straight regardless of the angle of the crankshaft unless the elongated flexible body is flexed by cylinder pressure conditions, wherein:

the connection rod portion includes a first shaped portion at the first end of the connection rod portion and a second shaped portion at the second end of the connection rod portion;

each of the first and second end connectors includes a correspondingly shaped receptacle for receiving respective ones of the first and second shaped portions; and each of the first and second shaped portions includes a flat or profiled surface at a terminal end of the connection rod portion so that the terminal end of the connection rod portion is spaced from the second end connector in the receptacle thereof to eliminate point loading on the second end connector at the second end.

3. The device of claim 2, wherein each of the first and second end connectors includes an end surface facing the other of the first and second end connectors, and wherein each of the shaped receptacles includes chamfered surfaces defining an opening into the shaped receptacle at the end surface of the respective one of the first and second end connectors.

4. The device of claim 2, further comprising fasteners connecting each of the first and second shaped portions to respective ones of the first and second end connectors.

5. A device for connecting a piston and a crankshaft of an internal combustion engine, comprising:

a first end connector for connection with the piston;

a second end connector for connection with the crankshaft; and a connection rod portion including an elongated flexible body extending between a first end rotatably connected to the first end connector and a second end rotatably connected to the second end connector so that the elongated flexible body remains straight regardless of the angle of the crankshaft unless the elongated flexible body is flexed by cylinder pressure conditions, wherein the elongated flexible body defines a cross section with a depth extending in a direction paralleling an axis of rotation of the crankshaft and a width that is orthogonal to the depth, and wherein the depth is at least twice the width so that elastic buckling occurs laterally along the depth.

6. The device of claim 5, wherein the piston is housed in a combustion chamber of the internal combustion engine and the elongated flexible body is configured to remain stiff at cylinder pressures in the combustion chamber that are under a cylinder pressure threshold and to elastically buckle at cylinder pressures above the cylinder pressure threshold.

7. The device of claim 6, wherein cylinder pressure above the cylinder pressure threshold is converted to strain energy by the connection rod portion to store energy from the cylinder pressure and provide a constant pressure combustion process above the cylinder pressure threshold and the connection rod portion is configured to release the stored strain energy in response to cylinder pressures in the combustion chamber being less than the cylinder pressure threshold.

8. The device of claim 1, wherein the elongated flexible body includes a plurality of adjacent flexible rod portions, and one or more of the plurality of flexible rod portions is configured to transmit more tension loading than compression loading between the piston and crankshaft and one or more other of the flexible rod portions is configured to transmit more compression loading than tension loading between the piston and crankshaft.

9. A method for storing energy in a combustion chamber of an internal combustion engine, comprising:

combusting fuel in the combustion chamber, wherein the combustion chamber includes a piston connected to a crankshaft with a connection rod portion;

converting cylinder pressures in the combustion chamber that are above a cylinder pressure threshold to strain energy with the connection rod portion;

storing the strain energy in the connection rod portion; and releasing the stored strain energy in response to cylinder pressures in the combustion chamber being less than the cylinder pressure threshold, wherein the connection rod portion includes an elongated flexible body that defines a cross section with a depth extending in a direction paralleling an axis of rotation of the crankshaft and a width that is orthogonal to the depth, and wherein the depth is at least twice the width so that elastic buckling occurs laterally along the depth.

10. The method of claim 9, wherein the connection rod portion remains stiff between the piston and crankshaft at cylinder pressures below the cylinder pressure threshold and elastically buckles at cylinder pressures above the cylinder pressure threshold.

11. The method of claim 9, further comprising a first end connector associated with the piston and a second end connector opposite the first end connector associated with the crankshaft.

12. The method of claim 11, further comprising rotatably connecting the connection rod portion to the first and second end connectors so that the elongated flexible body remains straight regardless of the angle of the crankshaft unless the elongated flexible body is flexed by cylinder pressure conditions.

13. The method of claim 12, wherein the connection rod portion includes:
 a first shaped portion at a first end of the connection rod portion that is rotatably received in a correspondingly shaped receptacle of the first end connector; and
 a second shaped portion at a second end of the connection rod portion that is rotatably received in a correspondingly shaped receptacle of the second end connector.

14. The method of claim 13, wherein the first and second shaped portions and the first and second shaped receptacles include cylindrical shape with a diameter that is greater than a width of the elongated flexible body, wherein the elongated flexible body includes a depth orthogonal to and greater than the width, wherein the depth extends in a direction parallel to a longitudinal axis of the crankshaft, and the cylindrical shape of each of the first and second shape portions corresponds in depth to the elongate flexible body.

15. The method of claim 13, wherein each of the first and second shaped portions of the connection rod portion includes a flat surface at a respective terminal end of the connection rod so that the terminal end of the connection rod portion is spaced from the second end connector in the receptacle thereof to eliminate point loading on the second end connector at the second end.

16. The method of claim 13, wherein each of the first and second end connectors includes an end surface facing the other of the first and second end connectors, and wherein each of the shaped receptacles includes chamfered surfaces defining an opening into the adjacent shaped receptacle at the respective end surface to receive the respective first and second shaped portions at the first and second ends of the connection rod portion.

17. The method of claim 13, further comprising connecting each of the first and second shaped portions of the connection rod portion to respective ones of the first and second end connectors with fasteners.

18. The method of claim 9, wherein the connection rod portion is configured to elastically buckle to convert the cylinder pressures above the cylinder pressure threshold to strain energy.

* * * * *